(12) United States Patent
Konomi et al.

(10) Patent No.: US 8,014,836 B2
(45) Date of Patent: Sep. 6, 2011

(54) TELEPHONE APPARATUS

(75) Inventors: Toshiharu Konomi, Fukuoka (JP);
Yoshikazu Okada, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1314 days.

(21) Appl. No.: 11/562,020

(22) Filed: Nov. 21, 2006

(65) Prior Publication Data
US 2007/0123321 A1 May 31, 2007

(30) Foreign Application Priority Data

Nov. 24, 2005 (JP) ................. 2005-338220

(51) Int. Cl.
*H04M 1/00* (2006.01)

(52) U.S. Cl. ............. 455/575.1; 455/550.1; 455/569.1; 379/428.01; 379/419

(58) Field of Classification Search ............. 455/569.1, 455/570, 575.1, 575.8, 550.1; 379/428.01, 379/419, 420.01
See application file for complete search history.

(56) References Cited

U.S. PATENT DOCUMENTS

| 2003/0096632 | A1* | 5/2003 | Kim et al. ............. 455/550 |
| 2004/0202338 | A1* | 10/2004 | Longbotttom et al. ....... 381/190 |
| 2005/0130716 | A1* | 6/2005 | Shin et al. ............. 455/575.1 |
| 2005/0221867 | A1* | 10/2005 | Zurek et al. ............. 455/569.1 |
| 2005/0277450 | A1* | 12/2005 | Hoshijima ............. 455/575.1 |
| 2006/0084468 | A1* | 4/2006 | Kim ............. 455/550.1 |

FOREIGN PATENT DOCUMENTS

| JP | 6-177809 | 6/1994 |
| JP | 2002-064609 | 2/2002 |
| JP | 2004-328047 | 11/2004 |

OTHER PUBLICATIONS

English language Abstract of JP 2002-064609.

* cited by examiner

*Primary Examiner* — Kamran Afshar
*Assistant Examiner* — Kathy Wang-Hurst
(74) *Attorney, Agent, or Firm* — Greenblum & Bernstein, P.L.C.

(57) ABSTRACT

Telephone apparatus in that a front cover 3 and a rear cover 4 are combined with each other to form a main body 2, and various components are provided in the main body 2. The front cover 3 includes a transmitter 5, an operating unit 6, a display unit 7, and a receiver 8 from the bottom of the main body 2. In the front cover 3, a main tone hole 85 is provided in the vicinity of a speaker 82, and a sub-tone hole 86 is provided below the speaker 82.

13 Claims, 16 Drawing Sheets

TELEPHONE APPARATUS

CROSS REFERENCE TO RELATED APPLICATION

This application is based upon and claims the benefit of priority of Japanese Patent Application No. 2005-338220, filed on Nov. 24, 2005, the contents of which are incorporated herein by reference in its entirety.

BACKGROUND OF THE INVENTION

1. Field of the Invention

The present invention relates to a telephone apparatus whose main body is held to a user's ear so that a user listens to a voice output from the telephone apparatus, and more particularly, to the structure of a telephone apparatus enabling a user to listen to a clear voice when the user holds the telephone apparatus to a user's earlobe.

2. Description of the Related Art

A reduction in the size or weight of telephone apparatuses having good portability, particularly, a remote phone of a cordless telephone apparatus, a cellular phone, and a PHS (personal handy phone system) has made rapid progress.

JP-A-2002-64609 discloses a telephone apparatus for enabling a user to listen to only the voice output from a speaker of a cellular phone. The telephone apparatus disclosed in JP-A-2002-64609 includes a voice pipe inserted into the earhole as a receiver.

A main body of the telephone apparatus is provided with a transmitter for inputting a voice and a receiver for enabling a user to listen to the voice. A speaker for generating a voice is used as the receiver. The transmitter is provided at the lower part of the main body of the telephone apparatus, that is, at a position corresponding to a uses mouth, and the receiver is provided at the upper part of the main body of the telephone apparatus, that is, at a position corresponding to a user's ear, so that the user can hold the telephone apparatus to a user's face and easily speak over the telephone apparatus. In addition, for example, an operating unit and a display unit are provided between the receiver and the transmitter. The display unit is a display panel, such as a liquid crystal display device, that displays various information items, such as a menu and operational information. The operating unit is composed of numerical keys for inputting a telephone number and functional keys for inputting a menu of the telephone apparatus. The operating unit and the display unit are sequentially arranged above the transmitter such that the user can operate the operating unit while viewing the display unit. For the purpose of convenience of explanation, it is considered that the receiver that is held to a user's ear is arranged at the upper part of the telephone apparatus and the transmitter is arranged at the lower part of the telephone apparatus. This structure is practically used in the telephone apparatus.

In order to reduce the size of the main body of the telephone apparatus, the gap among the transmitter, the operating unit, the display unit, and the receiver, the distance from the bottom of the main body to the transmitter, and the distance from the top of the main body to the receiver are getting smaller. It made efforts to secure the space in the front surface of the main body of the telephone apparatus by arranging the receiver closer to the upper end of the main body of the telephone apparatus.

In the case in which the receiver is arranged closer to the upper end of the main body of the telephone apparatus, when the user holds the main body of the telephone apparatus to a user's ear to listen to a voice, the upper part of the front surface of the main body of the telephone apparatus is put to the entire earlobe of the user, which causes the receiver to be located at a position higher than the earhole, resulting in the positional deviation between the receiver and the earhole of the user. This is because holding the upper part of the front surface of the main body of the telephone apparatus to the entire earlobe is more stable than holding the upper end of the main body of the telephone apparatus to the earhole.

When the user unconsciously holds the main body of the telephone apparatus to a user's ear, the user tends to hold the receiver at a position higher than the earhole. Therefore, the receiver arranged closer to the top of the main body of the telephone apparatus is positioned at the earlobe that is higher than the earhole. That is, a tone hole of the main body of the telephone apparatus that transmits a sound output from a speaker for generating a voice deviates from the earhole, which makes it difficult for the user to listen to the voice.

In this case, the user strongly presses the main body of the telephone apparatus against the user's ear in order to listen to a clear voice, which causes the tone hole to closely contact with the earlobe, making it more difficult for the user to listen to the voice.

SUMMARY OF THE INVENTION

Accordingly, it is an object of the present invention to provide a telephone apparatus having a small size and capable of making it easy for a user to listen to a voice output from a speaker in a wide range.

According to an aspect of the invention, a telephone apparatus includes: a speaker that is provided in the telephone apparatus and outputs a sound; a first tone hole that is provided in front of the speaker to be emitted the sound to the outside of the telephone apparatus; and a second tone hole that is separated from the first tone hole to be emitted the sound to the outside of the telephone apparatus.

According to the invention, a speaking source is provided in the vicinity of the upper edge of a telephone apparatus in order to reduce the size of the telephone apparatus. As a result, even when a main tone hole, that is, a first tone hole is blocked by a user's earlobe, a sound from a speaking member can reach the user's earlobe through a sub-tone hole, that is, a second tone hole. According to the invention, since at least one of the two tone holes is always opened regardless of the position of the telephone apparatus with respect to a user's ear, it is possible for a user to easily listen to the voice output from the speaking source and thus to listen to a clear voice.

According to the invention, it is unnecessary to additionally provide a special structure or component in order to provide a sub-tone hole. Therefore, it is possible to reduce the overall size of a telephone apparatus and to prevent an increase in manufacturing costs. Further, it is possible to freely change the position or shape of the sub-tone hole by using the existing constituent component. As a result, there is no restriction in the design of a telephone apparatus, and thus it is possible to design the telephone apparatus to be easily operated.

DESCRIPTION OF THE PREFERRED EMBODIMENTS

First Embodiment

A remote phone of a cordless telephone apparatus, which is an example of a telephone apparatus according to an embodiment of the invention, will be described with reference to the accompanying drawings. In this specification, a receiver held to a user's ear is disposed at the upper side and a transmitter held to a user's mouth is disposed at the lower side, on the basis of the aspect used.

Figure 1:
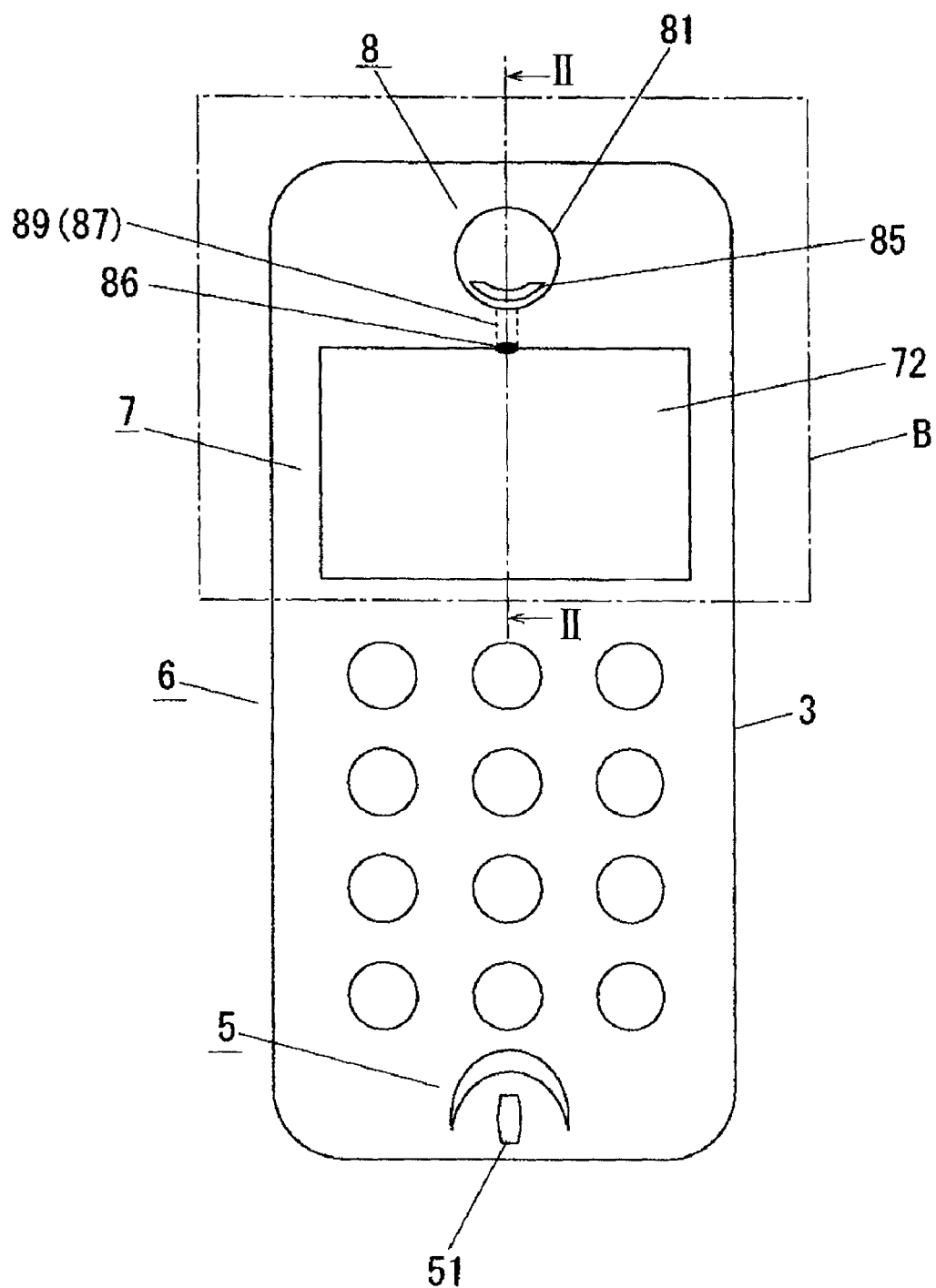
FIG. 1 is a front view of a telephone apparatus according to a first embodiment of the invention.
Figure 2:
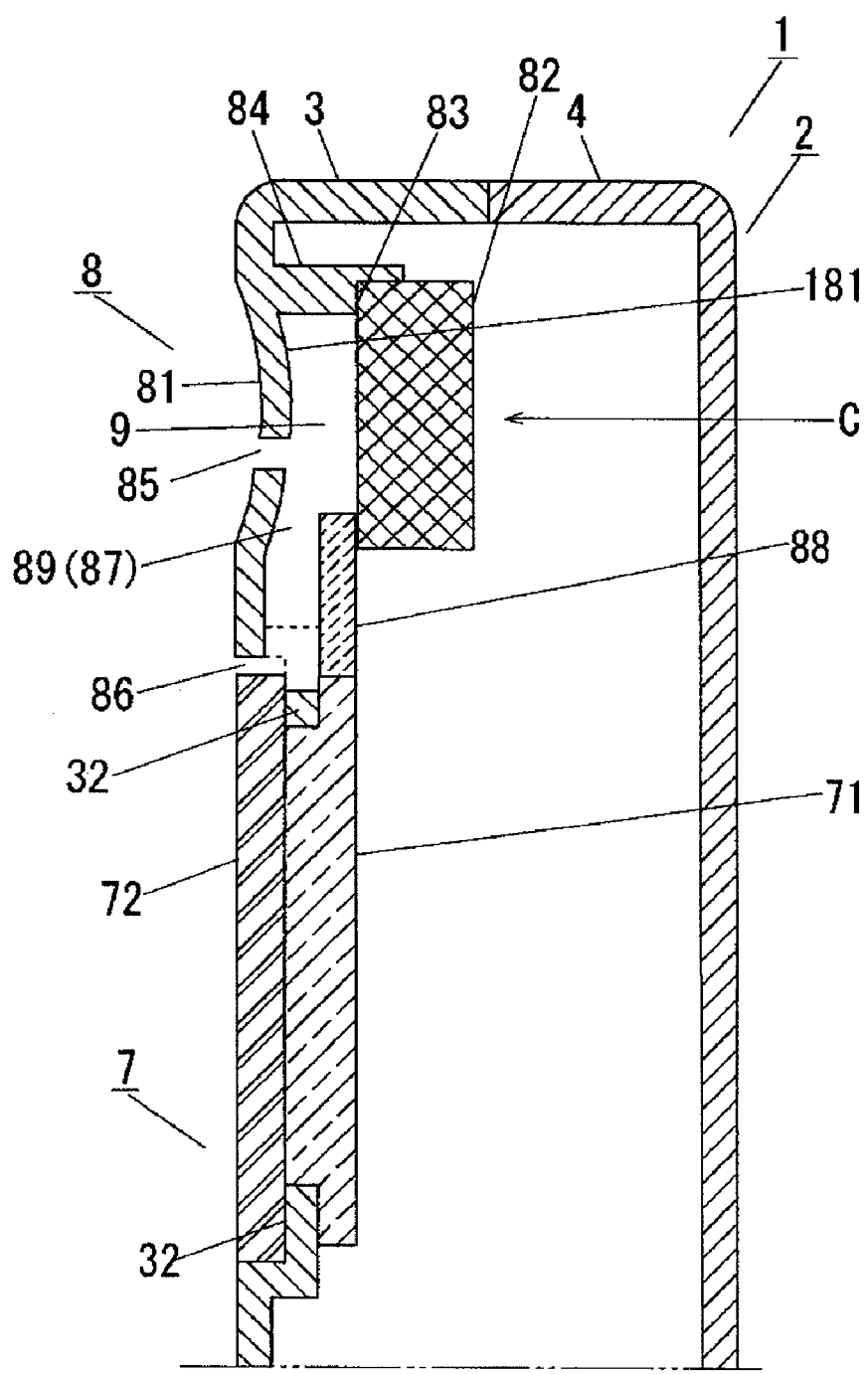
FIG. 2 is a cross-sectional view taken along the line II-II of FIG. 1.
Figure 3:
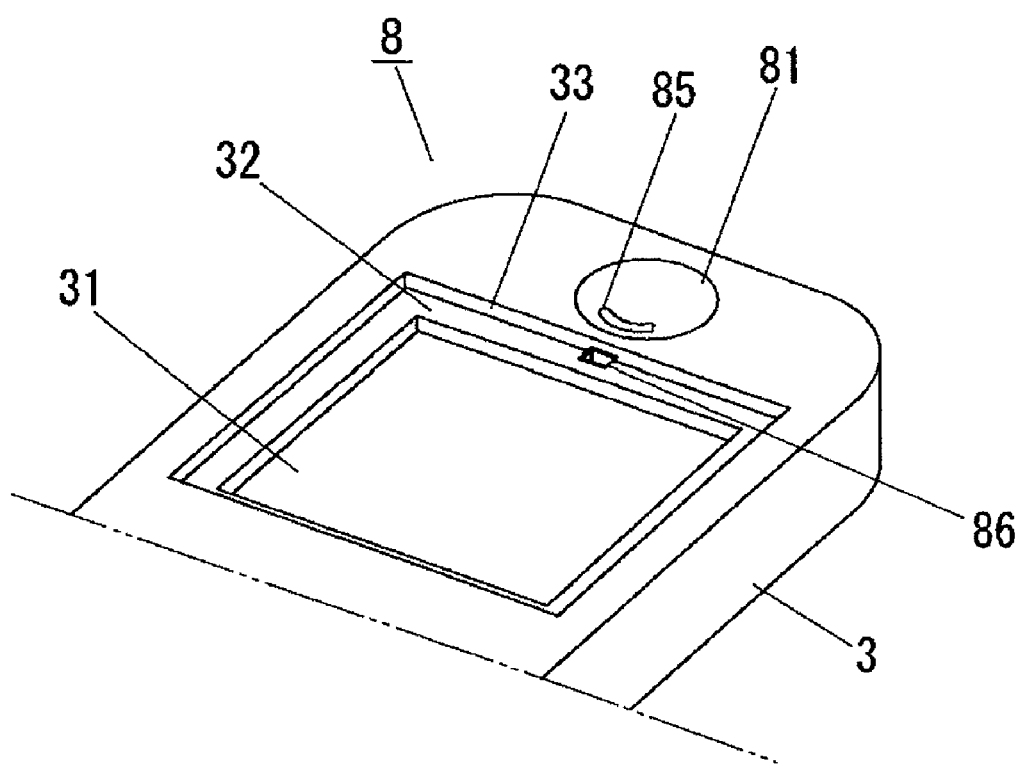
FIG. 3 is an enlarged perspective view of a portion B of FIG. 1.
Figure 4:
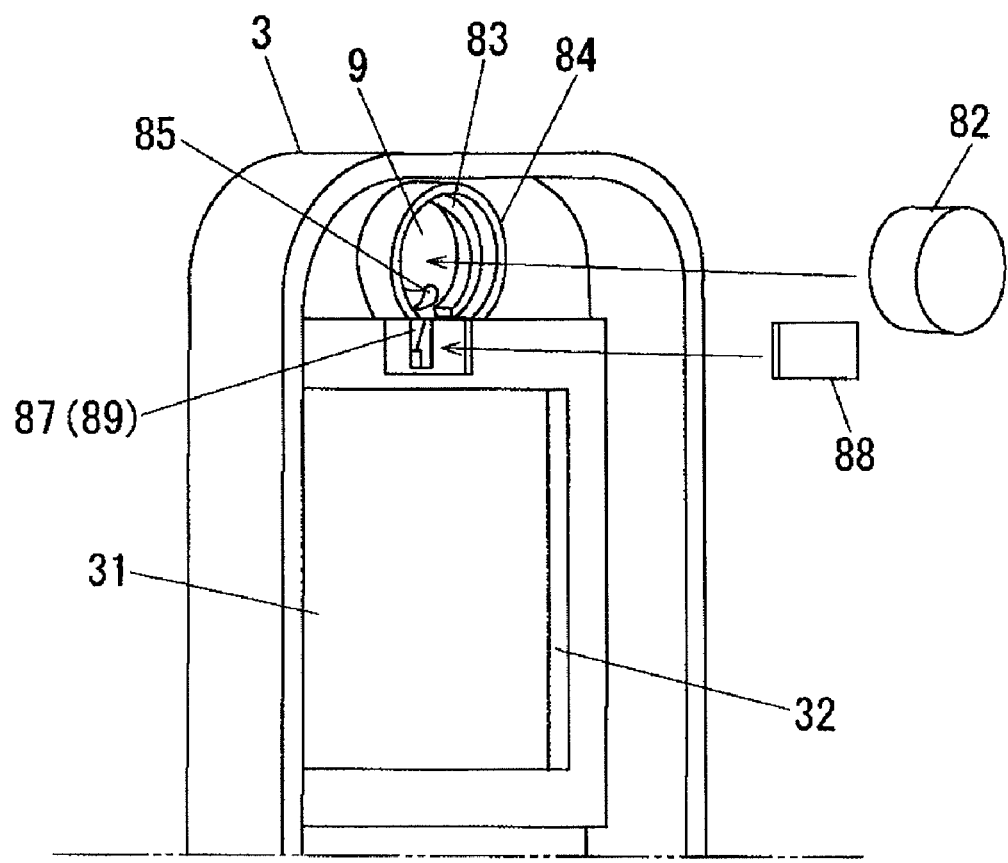
FIG. 4 is an enlarged perspective view as viewed from a direction of arrow C of FIG. 2.

First, the structure of a telephone apparatus according to a first embodiment will be described with reference to FIGS. 1 to 4. FIG. 1 is a front view of the telephone apparatus according to the first embodiment of the invention. FIG. 2 is a cross-sectional view taken along the line II-II of FIG. 1. FIG. 3 is an enlarged perspective view of a part B of FIG. 1 with a display unit cover detached from a front cover. FIG. 4 is an enlarged perspective view as viewed from a direction C of FIG. 2.

In FIGS. 1 and 2, the telephone apparatus of this embodiment is driven by a battery (not shown) and wirelessly communicates with a main phone (not shown) connected to a telephone line, thereby receiving and transmitting signals.

In a telephone apparatus 1, a front case 3 and a rear case 4 are combined with each other to form a housing of a main body 2, that is, a first housing serving as an outer shell. The front case 3 and the rear case 4 serve as the outer shell of the telephone apparatus 1. Components are provided in the outer shell of the telephone apparatus 1. The main body 2 includes a transmitter 5, an operating unit 6, a display unit 7, and a receiver 8 from the bottom of the front cover 3.

When a user holds the main body 2 to a user's face, the transmitter 5 is disposed in the vicinity of a user's mouth. A transmitter hole 51 is formed at the lower part of the front cover 3, and a microphone is arranged in the main body 2. The transmitter 5 has a function of inputting a voice spoken by a caller.

The operating unit 6 includes numerical keys from '0' to '9' used for a caller to input a telephone number and signal keys such as '*' and '#'. A hold key or an on-hook key, or selection keys whose upper, lower, right and left sides can be pressed may be used as the operating unit 6.

The display unit 7 has a function of displaying various information items. For example, the display unit 7 displays the state of the main body 2, the telephone number input through the operating unit 6, or a caller number when receiving a phone call. The display unit 7 includes a liquid crystal display (LCD) panel 71 arranged in an opening portion 31 formed in the front case 3 in a rectangular shape. A display unit cover 72 for protecting a display surface of the display panel is provided in the opening portion 31 so as to cover the liquid crystal display panel 71.

In this embodiment, the transmitter 5, the operating unit 6, and the display unit 7 are provided in the main body 2. However, alternatively, these components may be separated from the main body 2, a touch pad may be used, or another display member may be used. These members and the arrangement positions thereof are not the subject of the invention, and the invention is not limited to the members, positions, and shapes shown in FIG. 1.

The receiver 8 is arranged in the front cover 3 so as to be held to a user's ear when the user holds the main body 2 to a user's face. A receiver hollow 81 is provided at the upper part of the front cover 3. The receiver 8 will be described in detail below with reference to FIGS. 3 and 4.

A speaker 82, serving as a sound reproducing member, is arranged at the position (inside the main body 2) of the receiver hollow 81 provided in the front cover 3. The speaker 82 is formed in, for example, a substantially cylindrical shape, and has a function of generating a phone call as a sound. The size of the receiver hollow 81 is substantially equal to the size of the front surface of the speaker 82 that generates a sound. A main tone hole 85 is formed in the front cover 3 at the lower side of the receiver hollow 81 having a substantially circular shape, that is, at a position leaning to the display unit 7. The main tone hole 85 is formed as an arc-shaped elliptical hole through which the sound from the speaker 82 is output. That is, the main tone hole 85 is provided around the receiver hollow 81 at the position where the speaker 82 is provided.

As described above, the main tone hole 85 is provided in the front surface of the speaker 82 that output a sound (that is, a speaking portion), and the sound output from the speaker 82 travels from the front surface thereof to the main body 2 and is then output from the main body 2 to the outside (to a caller's ear). In addition, as described above, the main tone hole 85 is not necessarily formed in the shape of a hole, but the main tone hole 82 may be formed in any shape as long as it can transmit a sound to the outside of the main body 2 through the main body. The main tone hole is called a first tone hole.

The speaker 82 is not limited to the cylindrical shape, but it may be formed in a cylindroid shape or a prism shape. The main tone hole 85 is not limited to the elliptical shape. For example, the main tone hole 85 may be formed of any one or some of a circular hole, a polygonal hole, and an elliptical hole. Since the shapes of the members are not the subject of the invention, the shapes are not limited to those described above with reference to in FIG. 1.

A peripheral wall portion 84 having a substantially ring shape is formed in the front cover 3 in order to support the speaker 82 formed in a substantially cylindrical shape. The peripheral wall portion 84 has a step portion 83 formed in the inner circumferential surface thereof. The speaker 82 abuts on the step portion 83 and is supported by the peripheral wall portion 84, so that a chamber 9 is formed in front of the speaker 82 (the front surface of the speaker from which a sound is output). The chamber 9 is also used to obtain the effect of resonance. That is, the sound output from the speaker 82 travels to the front surface thereof and is then emitted from the main tone hole 85 to the outside of the main body 2 through the chamber 9. This path of the sound is referred to as a first path. The step portion 83 is given as an example of the first embodiment, and the step portion 83 is not limited to the step shape as long as it can position the speaker 82 and fix the speaker 82.

A shelf portion 32 for supporting the display unit cover 72 is provided in an inner circumferential portion of the opening portion 31 of the cover 3. A sub-tone hole 86 is formed penetratingly in the front case 3 at the lower part of the main tone hole 85 and at the upper part of an inner circumferential wall portion 33 of the opening portion 31. The sub-tone hole 86 passing through the front cover 3 is also formed in the display unit cover 72.

The sub-tone hole 86 is disposed below the speaker 82, which is a speaking member, at a position separated from the receiver hollow 81 (in the front surface from which the sound output from the speaker 82 is emitted, that is, at a position separated from the main tone hole 85 toward the transmitter 5). The sub-tone hole 86 formed in the display unit cover 72 and the front cover 3 is connected to a groove 87 formed in the shelf portion 32. A portion of the peripheral wall portion 84 is cut out so that the groove 87 communicates with the chamber 9. Therefore, a propagative chamber 89, which is a space including the chamber 9 and the sub-tone hole 86 communicating with each other through the groove 87, is formed.

The sub-tone hole 86 is a tone hole which is provided at a position separated from the main tone hole 85 as an auxiliary member and through which a sound is output to the outside of the main body 2. Similar to the main tone hole 85, the sub-tone hole 86 is not necessarily a hole. For example, the sub-tone hole 86 may be formed of any shape as long as it can allow a sound to be emitted to the outside of the main body 2 through the housing. Therefore, the sub-tone hole 86 is referred to as a second tone hole. The second tone hole is provided so as to be separated from the first tone hole toward the transmitter. Therefore, regardless of the position of the telephone apparatus held by a user with respect to a user's, the second tone hole is opened. In addition, since at least one of the first and second tone holes are opened, it is easy to listen to the voice of a speaking source, and thus to clearly listen to a voice.

A substantially rectangular step portion is formed around the groove 87. The step portion is covered with a lid portion 88, which causes the groove 87 to communicate with the chamber 9. A space composed of the groove 87 and the chamber 9 serves as a propagative chamber 89. A space from the chamber 9 to the sub-tone hole 86, that is, the propagative chamber 89 communicates with a space formed in front of the speaker 82, but is separated from the rear surface of the speaker 82. In other words, the second tone hole communicates with a speaking member along a path through which a sound emitted from the speaking member is guided into the second tone hole. In this way, a space from the speaking member to the second tone hole is formed, and thus a voice can be output from the sub-tone hole 86. Therefore, it is possible to listen to a clear voice in a wider audible range than the conventional audible range.

The sound output from the speaker 82 travels to the sub-tone hole 86 separated from the receiver 8 through the propagative chamber 89, and then the sound is emitted to the outside of the main body 2. That is, the sound output from the speaker 82 travels forward and a portion of the sound reaching the chamber 9 is emitted from the sub-tone hole 86 to the outside of the main body 2 through the propagative chamber 89, which is referred to as a second path. The first path and the second path share a portion of the chamber 9, which is called a common region.

The lid portion 88 has been described above in order to explain the structure of the propagative chamber 89. However, a part (not shown) for mounting a circuit and parts forming the operating unit 6 and the display unit 7 are provided in the telephone apparatus 1, and a housing member is used to mount these parts. The lid portion 88 may be formed to have the housing member forming the inside of the housing. Therefore, in the invention, the housing member forming the inside of the housing including the lid portion 88 is referred to as a second housing. According to this embodiment of the invention, a special structure or a part for providing the sub-tone hole is not needed, which makes it possible to reduce the overall size of the telephone apparatus and prevent an increase in manufacturing costs.

The use of the telephone apparatus 1 according to the first embodiment of the invention having the above-mentioned structure will be described with reference to FIGS. 1 to 4. When receiving a phone call and talks over the telephone, a user holds the main body 2 with a user's hand, operates the operating unit 6 to change the state of the telephone from a call receiving state to a call communication state, and holds the telephone to a user's ear. A call sound is output from the speaker 82. The sound output from the speaker 82 is emitted from the main tone hole 85 through the chamber 9.

When the user converse over the telephone, if the position of the telephone with respect to the user's ear varies, and the main tone hole 85 contacts an earlobe to be blocked by the earlobe, which makes it difficult for the user to listen to the sound output from the speaker 82 through the main tone hole 85. Even when the main tone hole 85 deviates to the earlobe due to such a situation, the sub-tone hole 86 provided below the speaker 82 of the main body 2 is positioned to correspond to the earhole. Therefore, the user can listen to the voice output from the sub-tone hole 86 without any difficulty.

As such, even when the main tone hole 85 contacts the earlobe to be blocked by the earlobe, a sound is emitted from the sub-tone hole 86, which makes it possible for a caller to listen to the sound in a wide audible range. When the main tone hole 85 is not blocked, a voice is emitted from both the main tone hole 85 and the sub-tone hole 86, which makes it possible to further widen an audible range (spread range). Therefore, any one of the main tone hole 85 and the sub-tone hole 86 is opened regardless of the position of the telephone apparatus with respect to a user's ear. In particular, since the sub-tone hole 86 is separated from the main tone hole 85 toward the transmitter 5, the sub-tone hole 86 is always opened regardless of the position of the telephone apparatus with respect to a user's ear. In this way, since any one of the two tone holes is always opened, it is possible to for a user to easily listen to the voice from a speaking source and thus to listen to a clear voice.

Figure 5:
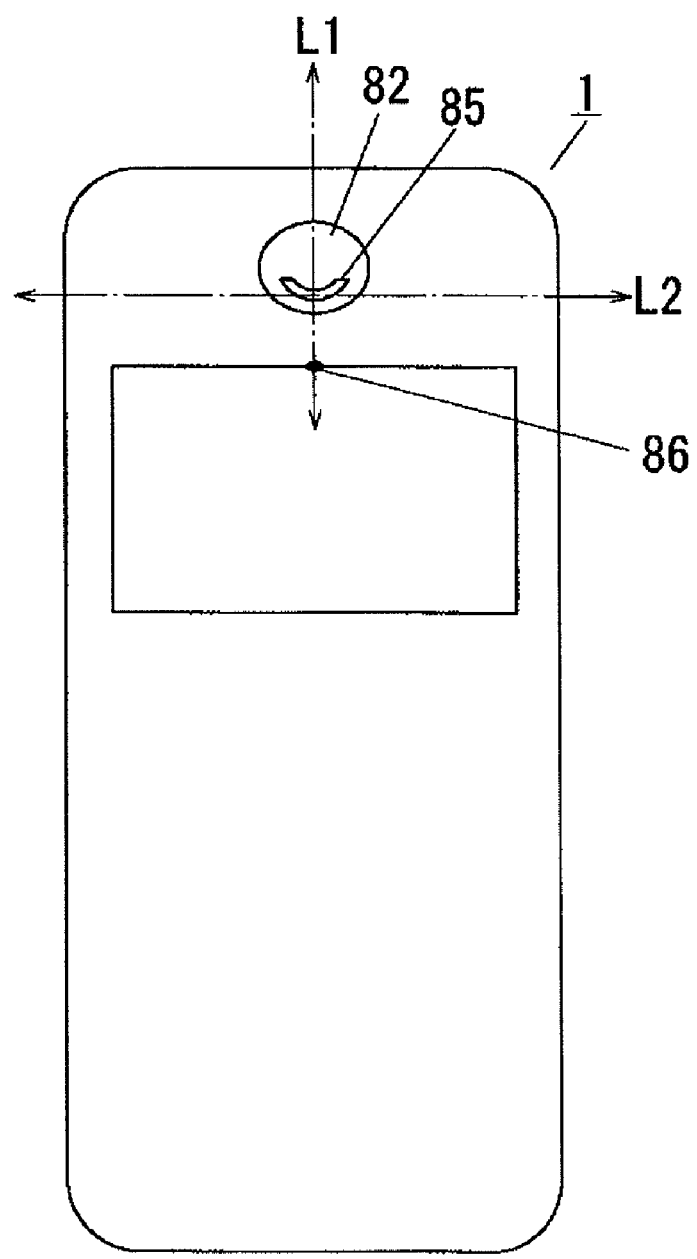
FIG. 5 is a diagram illustrating measuring points of the telephone apparatus shown in FIG. 1.
Figure 6:
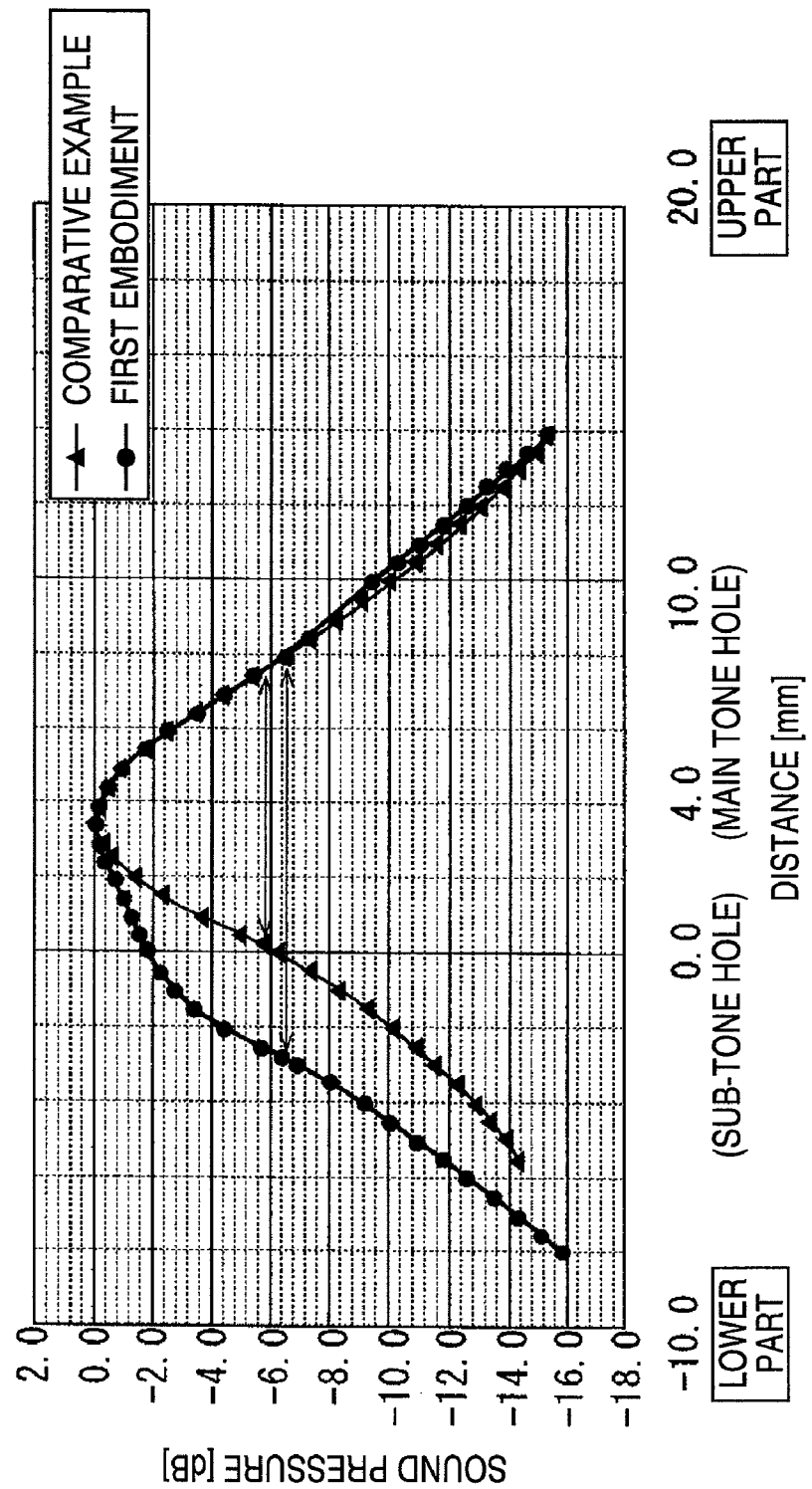
FIG. 6 is a diagram illustrating the result measured in a direction of arrow L1 in FIG. 5.
Figure 7:
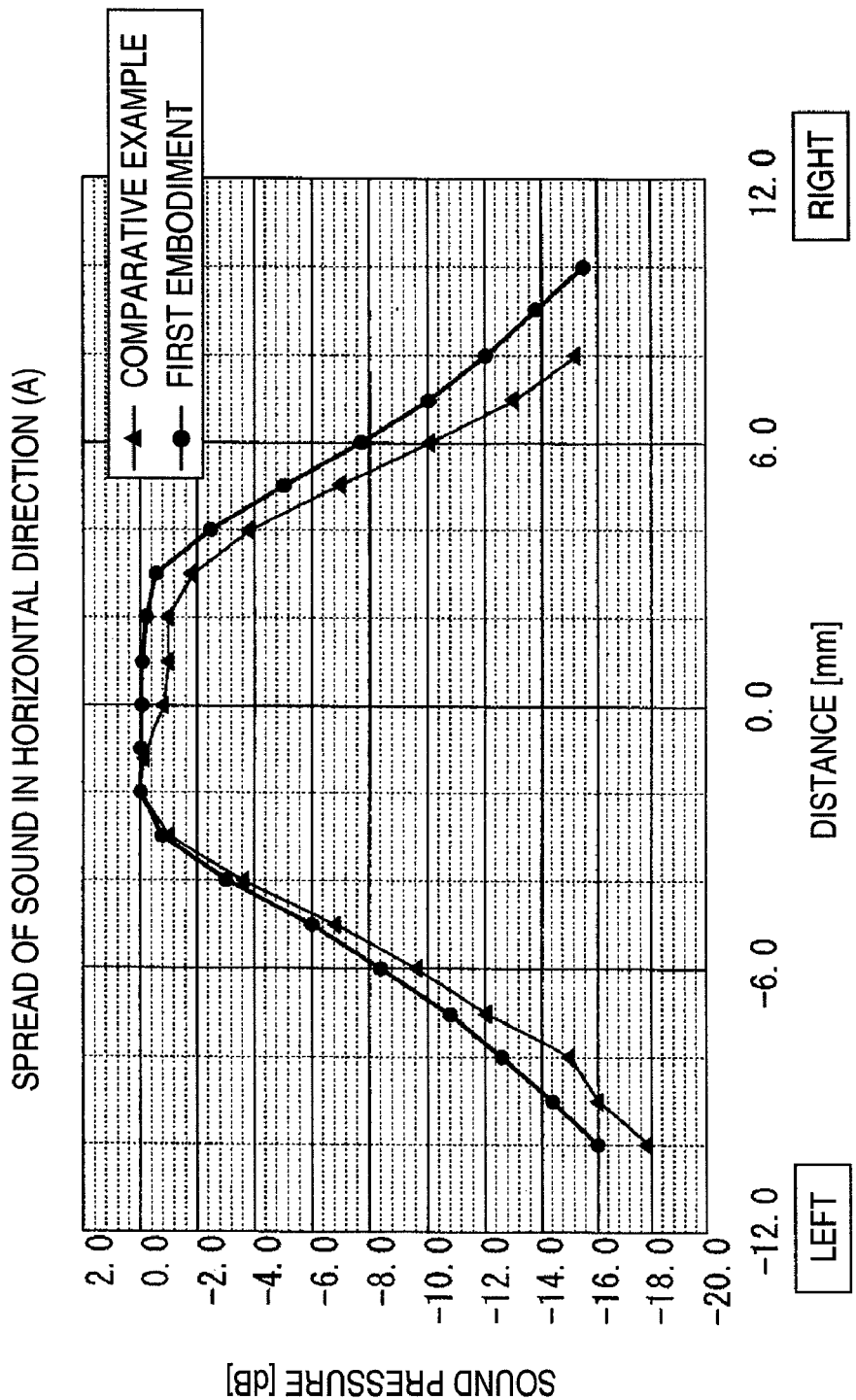
FIG. 7 is a diagram illustrating the result measured in a direction of arrow L2 in FIG. 5.

Next, the effects of the telephone apparatus 1 according to the first embodiment of the invention will be described below with reference to FIGS. 5 to 7. FIG. 5 is a diagram illustrating measuring points of the telephone apparatus 1 shown in FIG. 1. FIG. 6 is a diagram illustrating the measured result in a direction of arrow L1 in FIG. 5. FIG. 7 is a diagram illustrating the measured result in a direction of arrow L2 in FIG. 5. In FIGS. 6 and 7, a telephone apparatus whose sub-tone hole 86 is blocked is used as a comparative example. The telephone apparatus 1 according to the first embodiment is represented by a symbol 'O', and the comparative example is represented by a symbol 'Δ'.

In FIG. 5, the spread of a sound in the vertical direction is measured with the sub-tone hole 86 of the telephone apparatus 1 as a reference point (see the measuring direction of arrow L1). The measured result is shown in FIG. 6. In FIG. 6, the main tone hole 85 is arranged at a position having the maximum sound pressure in the first embodiment and the comparative example. And the main tone hole is arranged at a distance of 4 mm in FIG. 6.

In FIG. 6, in the comparative example, the sound pressure is lowered suddenly as the distance from the main tone hole 85 increases. In contrast, in the first embodiment, the sound pressure is more slightly lowered than the comparative example as the distance increases to lower part. And a difference in sound pressure between the first embodiment and the comparative example is remarkable as the measuring point is further away from the sub-tone hole in the downward direction. For example, when the measuring point is measured at a distance of 2 mm in the downward direction from the sub-tone hole, which is positioned at a reference point of 0 mm, the difference between the sound pressures of the main tone hole and the sub-tone hole is 6 dB. This shows that the sound emitted from the sub-tone hole 86 prevents a reduction in the sound pressure and the audible range can be widened (spread range) in the vertical direction.

In FIG. 5, the sound spread in the horizontal direction (the widthwise direction of the main body 2) is measured using the position of the main tone hole 85 of the telephone apparatus 1 using a reference point (see the measuring direction of arrow L2 in FIG. 5). The measured result is shown in FIG. 7. FIG. 7 shows that the difference between the sound pressures of the first embodiment and the comparative example is little at the center of the speaker 82, but the level of the sound pressure of the first embodiment becomes higher than that of the comparative example as the distance from the center of the speaker 82 increases. As a result, FIG. 7 shows that the spread of a voice in the horizontal direction as well as in the vertical direction can be ensured as much as the conventional telephone apparatus or more than the comparative example.

Second Embodiment

Next, a remote phone of a cordless telephone apparatus, which is an example of a telephone apparatus according to a second embodiment of the invention, will be described with reference to the accompanying drawings. In particular, in the telephone apparatus according to the second embodiment, a sub-tone hole having another structure from that of the sub-tone hole according to the first embodiment will be described. The second embodiment differs from the first embodiment in that a sub-tone hole is formed in a slit shape in the front surface of a front cover 103. The sub-tone hole in a slit shape has the same width as that of a display unit.

Figure 8:
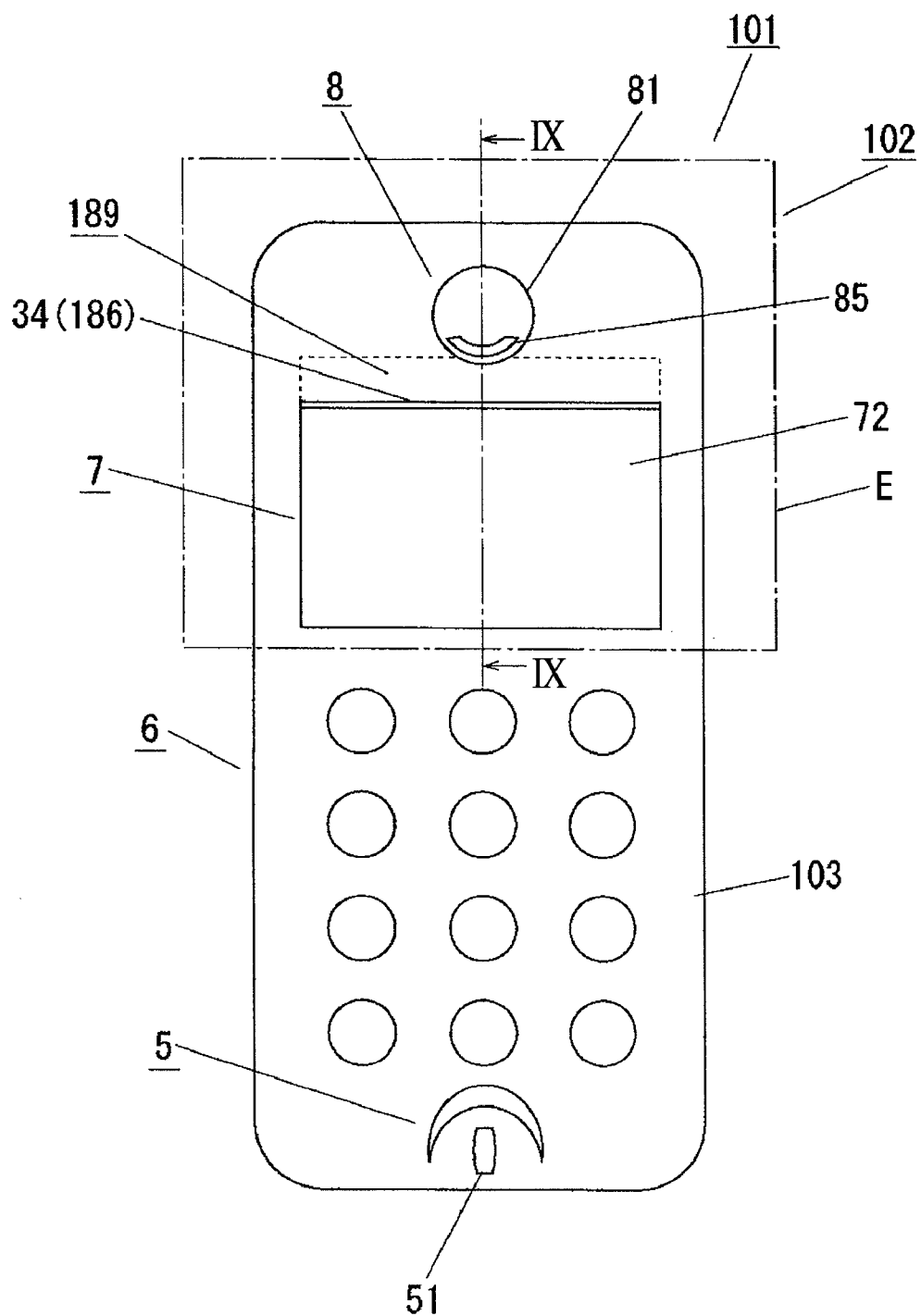
FIG. 8 is a front view of a telephone apparatus according to a second embodiment of the invention.
Figure 9:
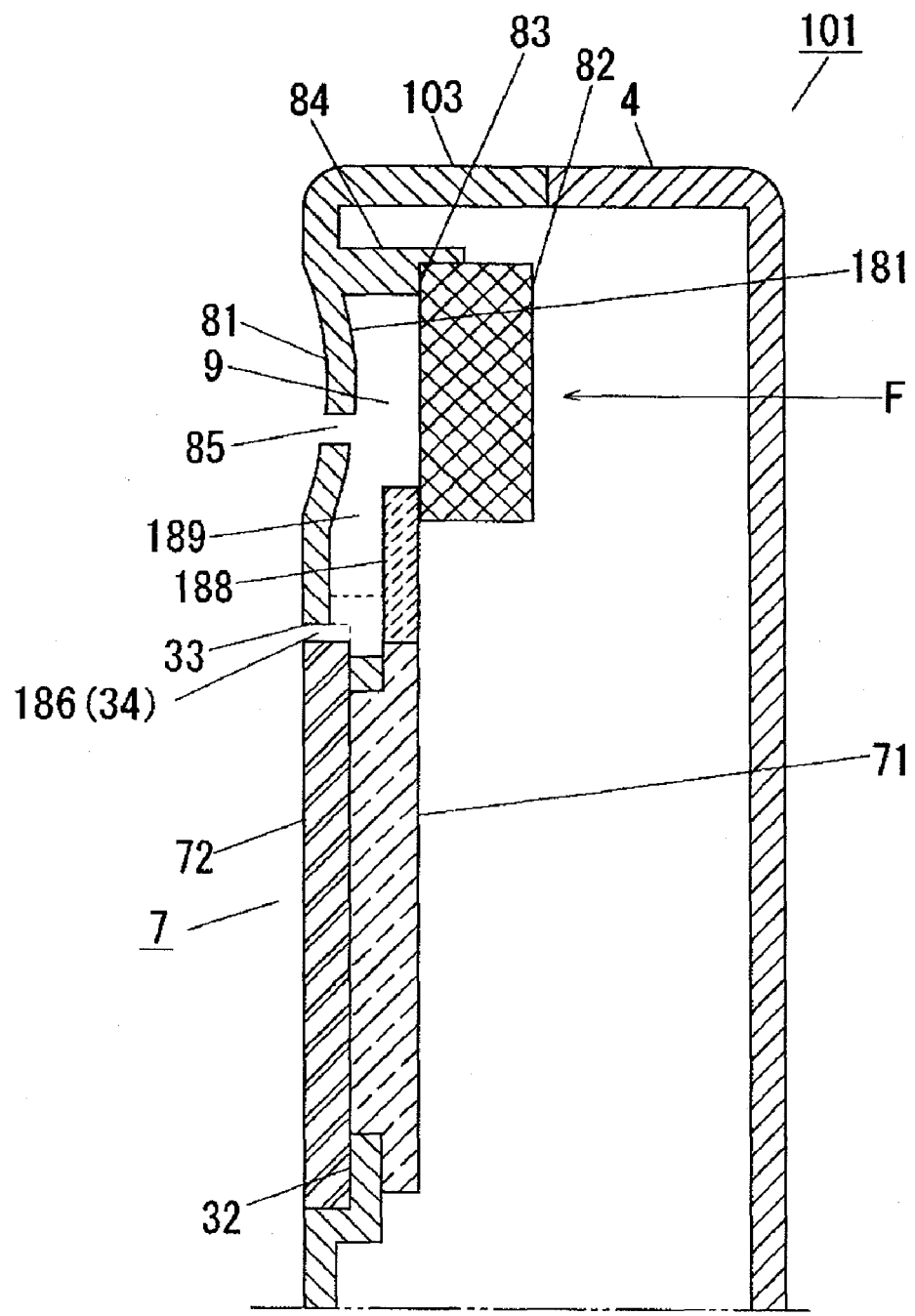
FIG. 9 is a cross-sectional view taken along the line IX-IX of FIG. 8.
Figure 10:
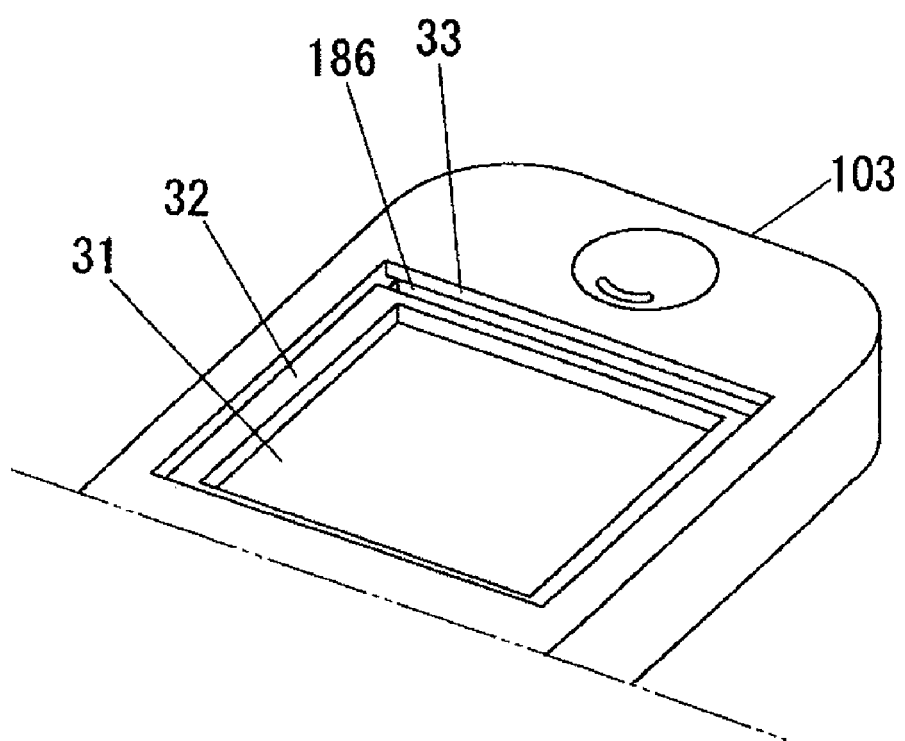
FIG. 10 is an enlarged perspective view of a portion E of FIG. 8.
Figure 11:
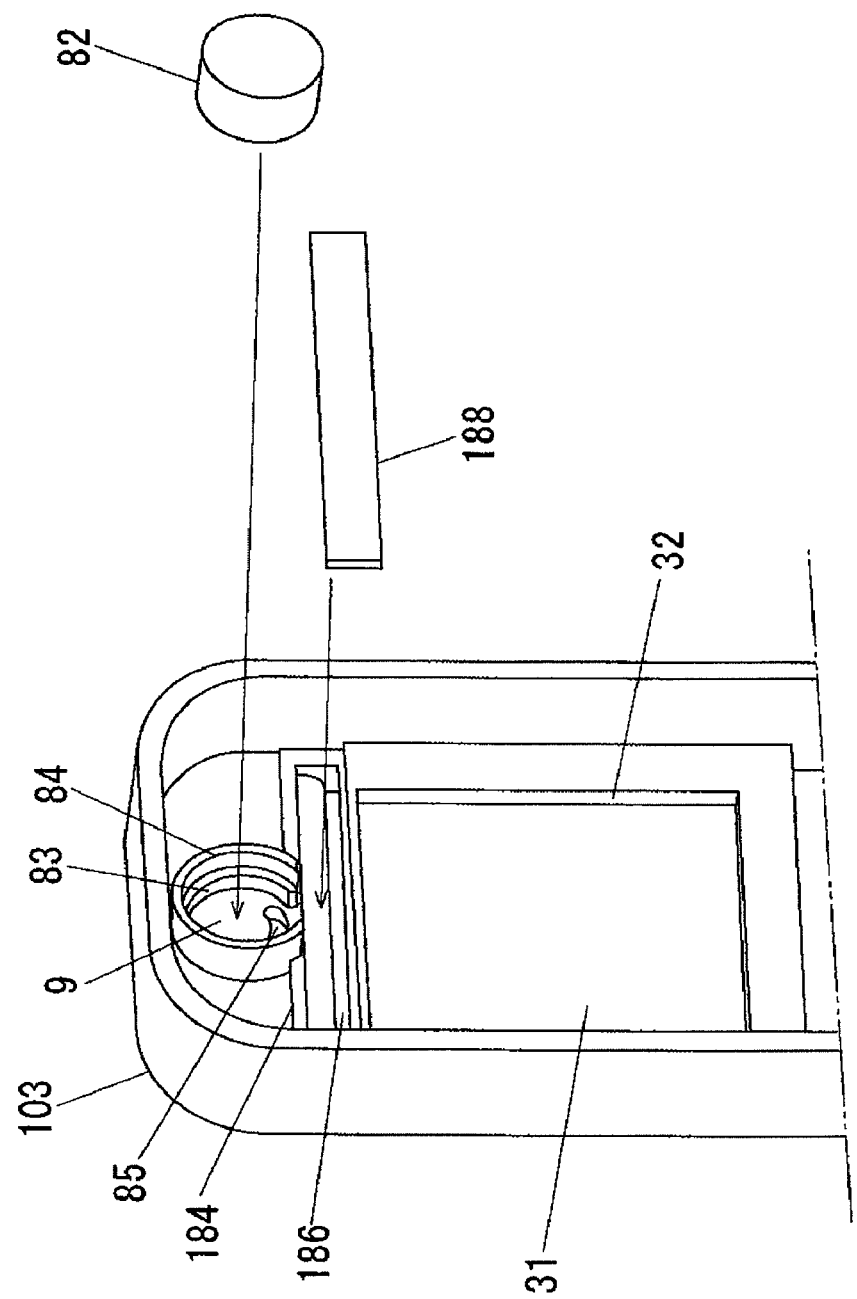
FIG. 11 is an enlarged perspective view as viewed from a direction of arrow F of FIG. 9.

FIG. 8 is a front view illustrating the telephone apparatus according to the second embodiment of the invention. FIG. 9 is a cross-sectional view taken along the line IX-IX of FIG. 8. FIG. 10 is an enlarged perspective view of a portion E shown in FIG. 8. FIG. 11 is an enlarged perspective view as viewed from a direction of arrow F in FIG. 9. In FIGS. 8 to 11, the same components as those shown in FIGS. 1 to 4 have the same reference numerals, and a description thereof will be omitted. In addition, in the second embodiment, a description of the first and second tone holes and a circuitous way is the same as that in the first embodiment.

In FIGS. 8 to 11, a main body 102 of a telephone apparatus 101 has a sub-tone hole 186. The sub-tone hole 186 is penetratingly formed in the front cover 103 with a larger width across the upper side of the front cover 103 in the widthwise direction. The sub-tone hole 186 is formed at upper edge of the opening portion 31 of the front cover 103, and is formed in a slit shape at the upper edge of the shelf 32 which is provided below the main tone hole 85 such that the slit has the same width as the shelf 32.

A sub-tone hole peripheral wall portion 184 is formed around the sub-tone hole 186 having a large width on the rear surface of the front cover 103. A portion of the sub-tone hole peripheral wall portion 184 is connected to the peripheral portion 84. A portion of the peripheral wall portion 84 and a portion of the sub-tone hole peripheral wall portion 184 form a cut-out portion. The cut-out portion causes a space surrounded by the sub-tone hole peripheral wall portion 184 to communicate with the chamber 9. In addition, a space formed by the sub-tone hole peripheral wall portion 184 is covered with a lid portion 188 formed in a rectangular shape.

Similar to the first embodiment, the lid portion 188 is referred to as a second housing. In this way, the space surrounded by the sub-tone hole peripheral wall portion 184 communicates with the chamber 9 by the cut-out portion, and thus the cut-out portion serves as a propagative chamber 189 for transmitting a sound to the sub-tone hole 186. In this way, similar to the first embodiment, the space in front of the speaker 82 is separated from the rear surface of the speaker 82. Therefore, it is possible for a user to listen to a clear voice without receiving the influence of the phase of the sound output from the speaker 82.

The sound output from the front surface of the speaker 82 is emitted from the main tone hole 85 through the chamber 9. At the same time, the sound is emitted from the sub-tone hole 186 through the chamber 9 and the propagative chamber 189. The sub-tone hole 186 formed in the front cover 103 so as to extend over the width of the opening portion 31 of the front cover 103 makes it possible to emit the sound output from the speaker 82 from the upper end of the display unit 7 in a wide audible range.

A display unit cover 72 is arranged on the shelf portion 32. The display unit cover 72 is mounted on the shelf 32 to block the opening portion 31 of the front cover 103, thereby protecting a display surface of a liquid crystal display panel 71. The length of the display unit cover 72 in the vertical direction (in a direction of the line IX-IX) is slightly smaller than the length of the opening portion 31 of the front cover 103 in the vertical direction (in the direction of the line IX-IX in FIG. 8) by a value required to ensure a clearance for mounting the display unit cover 72 on the shelf portion 32 (by a value required for the slit 34 serving as the sub-tone hole 186). In this way, the slit 34 that is not viewed by the user is formed between the upper edge of the inner circumferential wall portion 33 of the opening portion 31 of the front cover 103 and an upper edge among four edges of the display unit cover 72 so as to extend over the width of the liquid crystal display panel 71.

The display unit cover 72 of the display unit 7 in the telephone apparatus 101 according to the second embodiment has been described above. However, the invention is not necessarily limited to the display unit 7. For example, the invention may be applied to a telephone apparatus not requiring the display unit, or the invention may be applied to a surface cover of the operating unit 6. A housing auxiliary member mounted on the surface of the first housing, such as an operational surface or a display surface of the front cover 103 is referred to as a third housing of the invention.

The sound output from the front surface of the speaker 82 is emitted from the main tone hole 85 through the chamber 9 and directly reaches a user's earhole. The sound emitted from the main tone hole 85 and the sound passing through the chamber 9 and the propagative chamber 189 passes through the slit 34 formed between the display unit cover 72 and the inner circumferential wall portion 33 of the front cover 103, that is, the sub-tone hole 186 to reach the user's earhole. Therefore, it is possible to emit a sound output from the speaker 82 from the upper end of the display unit 7 in a wide range by forming the sub-tone hole 186 to extend over the width of the opening portion 31 of the front cover 103 such that the sub-tone hole 186 communicates with the slit 34. In this way, a sound is emitted around the display unit 7 to a user, and thus it is possible to make the sound travel to the user in a wide range (spread range).

In this embodiment, the sub-tone hole 186 is formed in a slit shape at the upper side of the display unit cover 72 so as to extend over the width of the display unit cover 72. The extending direction of the sub-tone hole 186 is the widthwise direction of the telephone apparatus 101, and corresponds to the horizontal direction when the telephone apparatus is used. However, the sub-tone hole 186 is not necessarily formed at the upper side of the display unit cover 72 so as to extend over the overall width of the display unit cover 72. For example, the sub-tone hole 186 may be formed at the upper side of the display unit cover 72 so as to extend at a length of half or a quarter of the width of the display unit cover 72. A structure in which a hole is formed at the center corresponds to the sub-tone hole 86 of the first embodiment. The position and shape of the sub-tone hole 86 and the number of sub-tone holes 86 can be variable using the existing constituent component, and the spread range of the sound can be arbitrarily set. Therefore, there is no restriction in the design, and thus it is possible to design a telephone apparatus to be easily operated.

Figure 12:
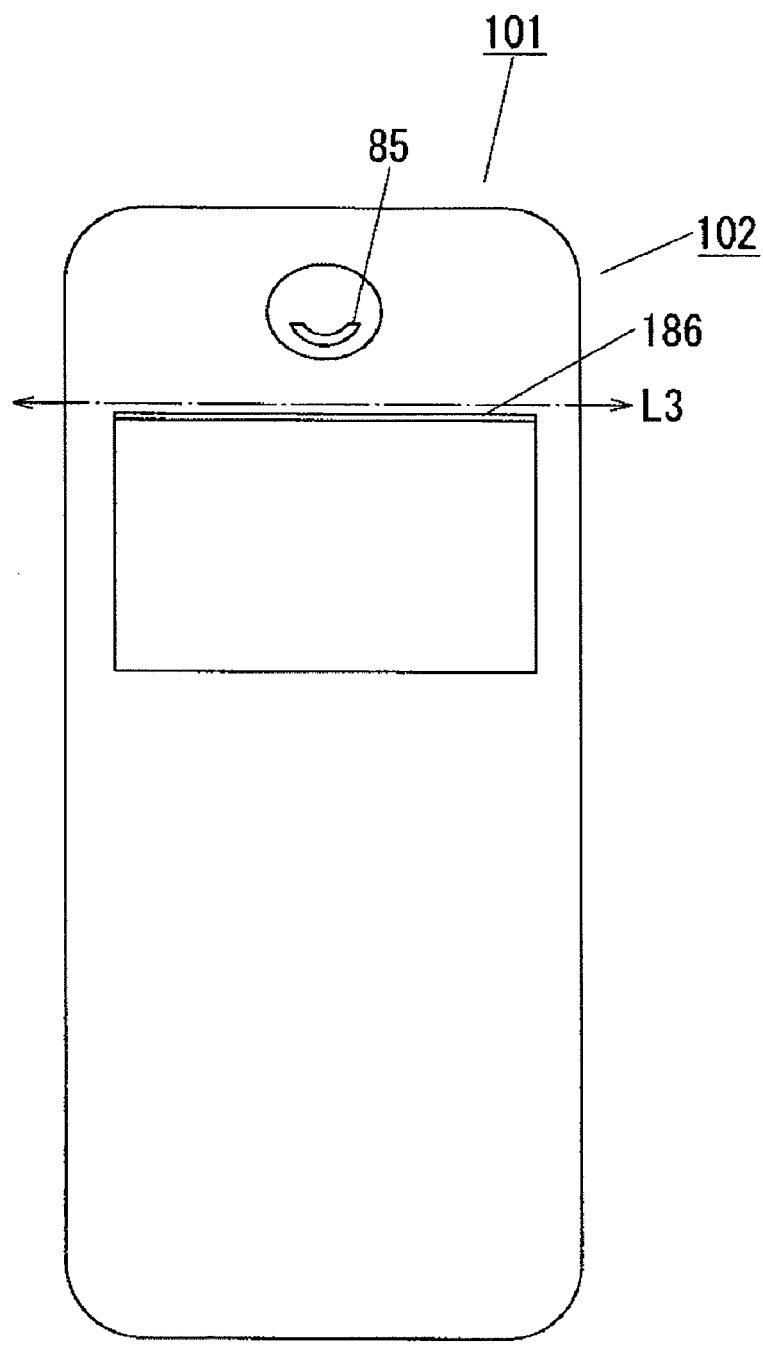
FIG. 12 is a diagram illustrating measuring points of the telephone apparatus shown in FIG. 8.
Figure 13:
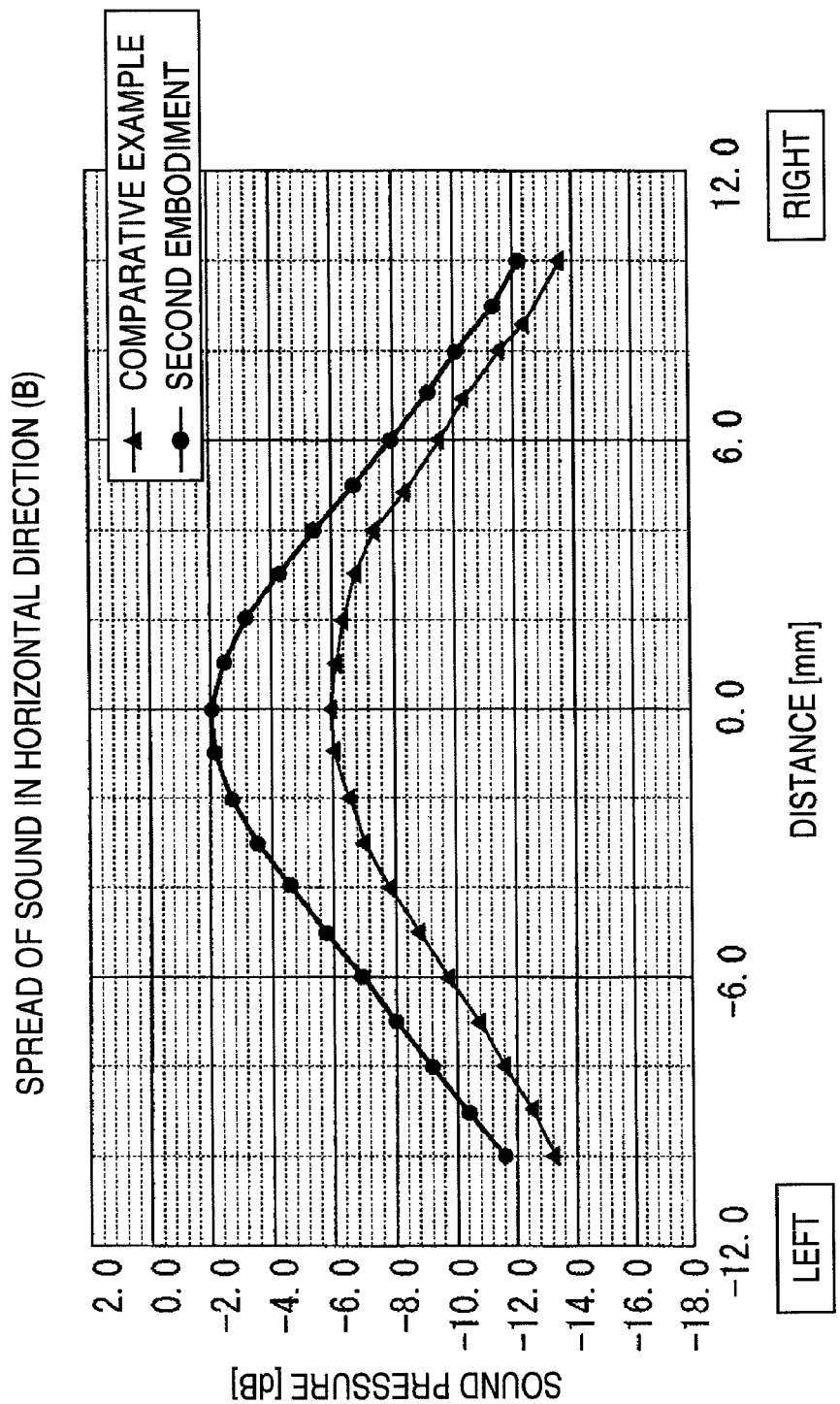
FIG. 13 is a diagram illustrating the result measured in a direction of arrow L3 in FIG. 12.

Next, the measured results of the sound spread of the telephone apparatus 101 according to the second embodiment will be described below. FIG. 12 is a diagram illustrating measuring points of the telephone apparatus shown in FIG. 8. The sound spread is measured in the horizontal direction (widthwise direction, see the measuring direction of arrow L3 in FIG. 12) with the sub-tone hole 186 of the telephone apparatus 101 used as a reference point. FIG. 13 is a diagram illustrating the measured result in a direction of arrow L3 in FIG. 12. In FIG. 13, the measured result of the telephone apparatus 101 according to the second embodiment is represented by a line that links points '◯'. A telephone apparatus whose sub-tone hole 186 is blocked is used as a comparative example, and the measured result thereof is represented by a line that links points 'Δ'.

In FIG. 13, a distance of 0 mm corresponds to the center of the telephone apparatus 101, and the sound spread is measured while a measuring point moves on the sub-tone hole 186 in the horizontal direction. The distance of 0 mm corresponds to the position having a distance of 0 mm in FIG. 6. As shown in FIG. 13, the sound pressure of the telephone apparatus according to the second embodiment is higher than that of the comparative example at the position having the distance of 0 mm by 4 dB. In addition, as shown in FIG. 7, in the comparative example, the sound pressure is suddenly lowered at a measuring point separated from the center of the telephone apparatus by 3 mm or more in the horizontal direction. In contrast, in the second embodiment, as shown in FIG. 13, even when the measuring point is separated from the center of the telephone apparatus by 5 mm in the horizontal direction, the maximum sound pressure of the comparative example is maintained. This shows that the second embodiment makes it possible to expand the effect of the sub-tone hole 186 in the horizontal direction by forming the sub-tone hole so as to extend in the widthwise direction. In addition, even when the measuring point is separated from the center of the telephone apparatus, the sound pressure at the point is not suddenly lowered unlike the comparative example shown in FIG. 7, which makes it possible to apply the invention in a wide range.

Third Embodiment

Next, a remote phone of a cordless telephone apparatus, which is an example of a telephone apparatus according to a third embodiment of the invention, will be described with reference to the accompanying drawings. The structure of a propagative chamber of the telephone apparatus according to the third embodiment differs from those according to the first and second embodiment. The third embodiment differs from the first embodiment in that a display unit propagative chamber is provided around a display unit.

Figure 14A:
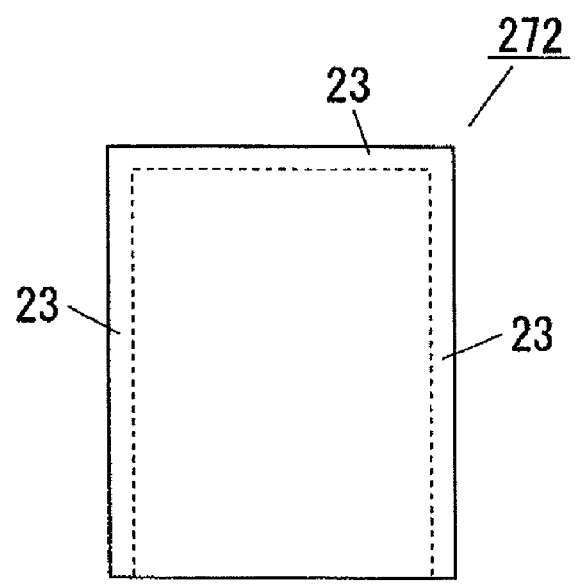
FIGS. 14A and 14B are diagrams illustrating a display unit cover according to a third embodiment of the invention.
Figure 14B:
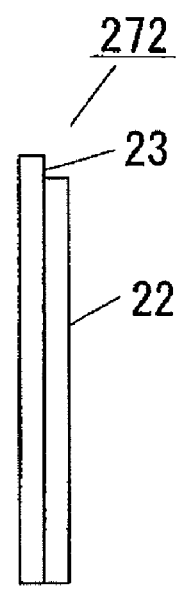
Figure 15:
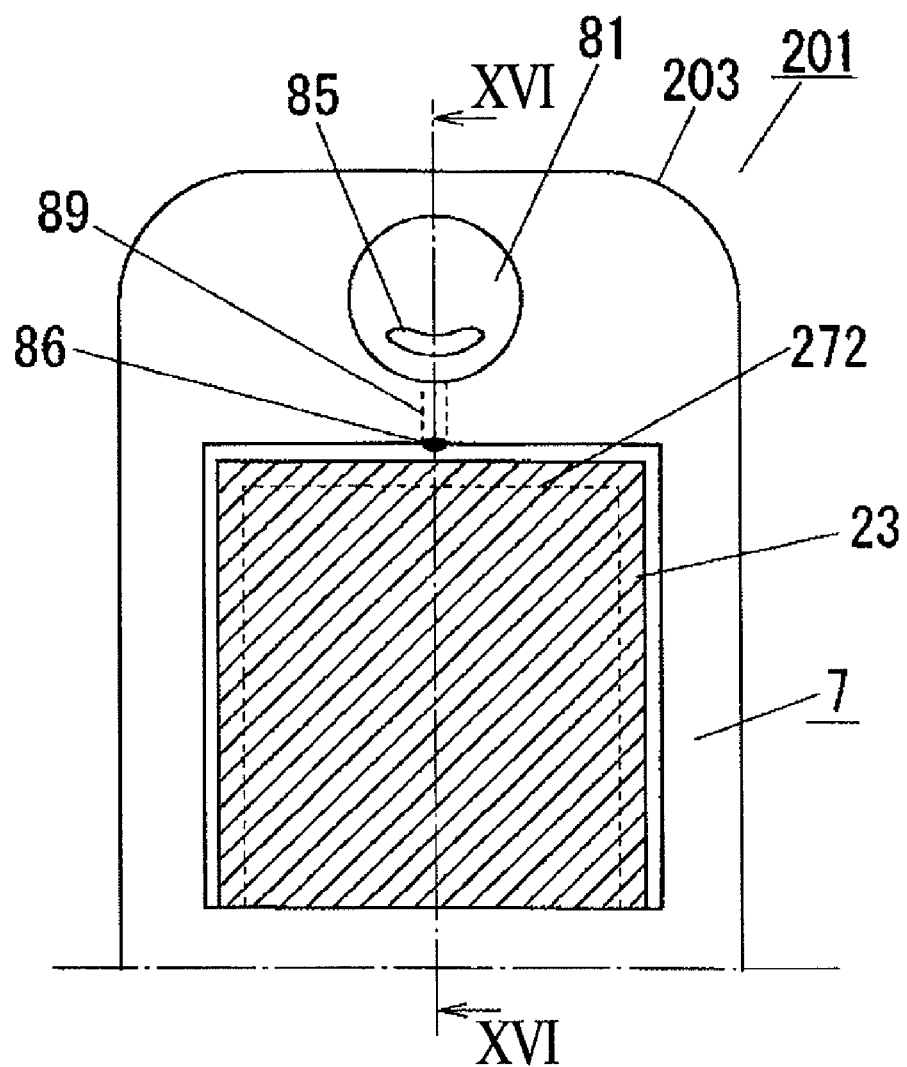
FIG. 15 is an enlarged front view of a telephone apparatus having the display unit cover shown in FIG. 14 attached thereto.
Figure 16:
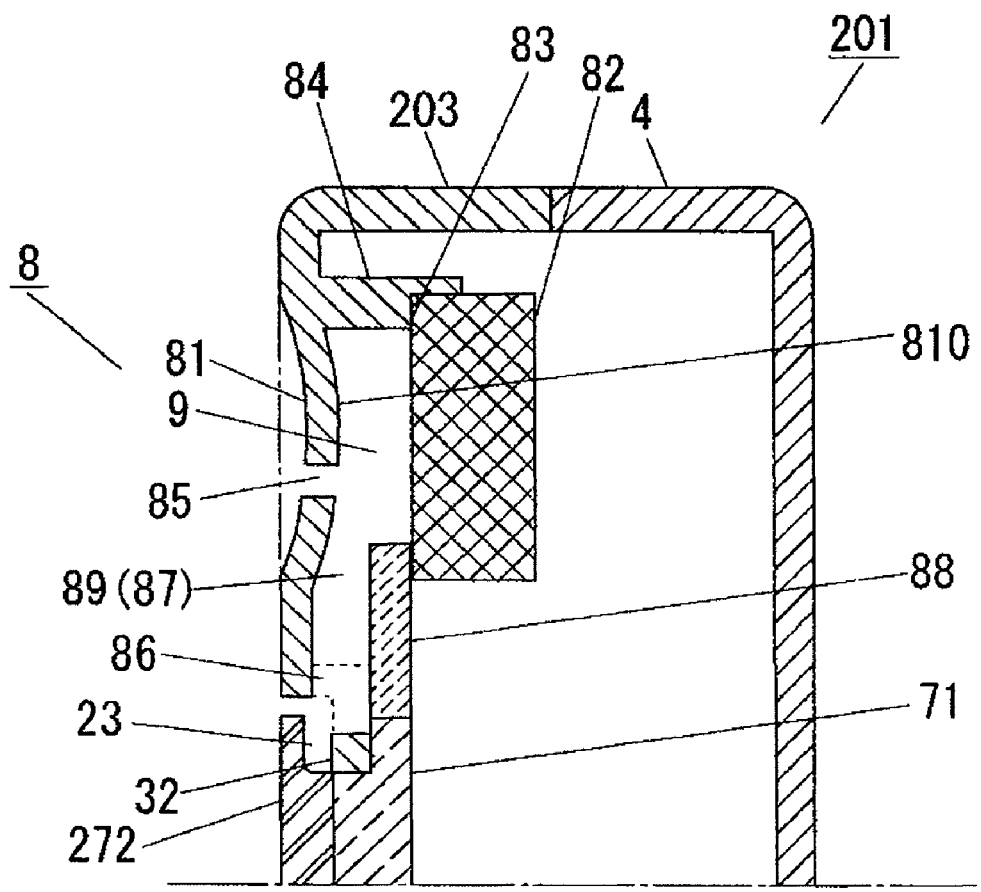
FIG. 16 is a cross-sectional view taken along the line XVI-XVI of FIG. 15.

FIGS. 14A and 14B are diagrams illustrating a display unit cover according to the third embodiment of the invention. FIG. 14A is a front view of the display unit cover as viewed from a user, and FIG. 14B is a side view of the display unit cover unit. FIG. 15 is a diagram illustrating the telephone apparatus having the display unit cover shown in FIGS. 14A and 14B attached thereto. FIG. 16 is a cross-sectional view taken along the line XVI-XVI of FIG. 15. In FIGS. 14A to 16, the same components as those shown in FIGS. 1 to 4 have the same reference numerals, and a description thereof will be omitted. In addition, in the third embodiment, a description of the first and second tone holes and the first and second paths is the same as that in the first embodiment.

In FIGS. 14A to 16, a telephone apparatus 201 includes a front cover 203 having a sub-tone hole 86 formed therein. At the upper edge of an opening portion 31 of the front cover 203, the sub-tone hole 186 is penetratingly formed in a shelf portion 32 below the main tone hole 85.

A display unit cover 272 according to the third embodiment of the invention is mounted on the shelf portion 32. As described in the first embodiment, a mounting surface 22 is mounted to a display surface of the liquid crystal display panel 71 in order to protect the display surface of the liquid crystal display panel 71 as shown in FIG. 14B and FIG. 16. In FIG. 14A, concave portions 23 are formed along three edges except for the lower edge among four edges of the display unit cover 272 (more specifically, which are referred to as cover hollows 23). In FIG. 14B, three edges among the four edges of the display surface 272 corresponding to the edges of the mounting surface 22 are cut out to form the cover hollows 23.

When the display unit cover 272 is mounted on the shelf portion 32 of the opening portion 31, a space is formed by the cover hollows 23, the shelf portion 32, and an inner circumferential wall portion 33 of the opening portion 31, which serves as a display unit propagative chamber. As described above, the cover hollows 23 are formed along the three edges of the display unit cover 272 except for the lower edge thereof. Therefore, the display unit propagative chamber is formed in a substantially U shape around the display unit cover 272 (see FIG. 14A) as viewed by the user. That is, the cover hollows 23 are provided along partial edges of the display unit cover 272, not along the all edges thereof.

As described in the first embodiment, since the sub-tone hole 86 is formed in the shelf portion 32, the display unit propagative chamber communicates with the sub-tone hole 86. Therefore, the display unit propagative chamber communicating with the sub-tone hole 86 is formed along three sides of the display unit 7. Similar to the first and second embodiments, since a space in front of the speaker 82 is separated from the rear surface of the speaker 82, it is possible for a user to listen to a clear voice without being affected by the phase of the sound output from the speaker 82.

Therefore, the display unit propagative chamber enables the voice emitted from the sub-tone hole 86 to be transmitted along the cover hollows formed around the edge of the display unit 7. Thus, it is possible to emit the sound output from a speaking member from the edge of the display unit 7. In addition, it is possible to emit the sound from the entire display unit. It is also possible to vibrate the display unit cover 282 to amplify the voice.

Further it is possible to combine the third embodiment in which the cover hollows 23 are provided along the edge of the display unit cover 272 with the second embodiment in which the slit 34 is used to transmit a sound along one edge of the display unit 7 and the sound is emitted from the slit 34 provided at the one edge of the display unit 7, that is, from a new sub-tone hole 186. The sub-tone hole 186 having a large width and the display unit propagative chamber make it possible to more effectively emit a sound.

Although the embodiments of the invention have been described above, the invention is not limited to the above-described embodiments. In the above-described embodiments of the invention, the cover hollows 23 are formed along three edges of the display unit cover 272 except for the lower edge thereof; but the invention is not limited thereto. For example, the cover hollows 23 may be formed at four edges of the display unit cover 272. Alternatively, the cover hollows 23 may be formed at the upper edge of the display unit cover, that is, one edge of the display unit cover communicating with the sub-tone hole 186. The display unit cover 272 may be surrounded by the display unit propagative chamber, which makes it possible for a speaker to feel the sound output from the entire display unit cover 272.

Alternatively, it is possible to combine the sub-tone hole 86 according to the first embodiment with the slit 34 according to the second embodiment to form a new sub-tone hole. In this case, the same effects as those according to the above-described embodiments can be obtained. It is also possible to combine the sub-tone hole 86 according to the first embodiment, the slit 34 according to the second embodiment, and the display unit propagative chamber according to the third embodiment, that is, the cover hollows 23 provided at the three edges of the display cover unit 272 to form a new sub-tone hole. In this case, it is also possible to obtain the same effects as those in the above-described embodiments.

Further, in the above-described embodiments of the invention, the sub-tone hole is formed at the upper side of the opening portion 31, but the invention is not limited thereto. For example, another sub-tone hole may be formed between the display unit 7 and the main tone hole 85. In this case, it is also possible to obtain the same effects as those in the first embodiment. In addition, in the above-described embodiments of the invention, a remote phone of a cordless telephone apparatus has been used as an example, but the invention is not limited thereto. For example, the invention may be applied to other telephone apparatuses, such as a cellular phone apparatus and a PHS, as long as main bodies of the telephone apparatuses can be held to a user's ear and used to make calls.

The invention can be applied to a telephone apparatus that is held to a user's ear and makes calls. According to the invention, it is possible to reduce the size of a telephone apparatus and for a user to easily listen to a voice in a wide range. In particular, the invention can be most suitable for a remote phone of a cordless telephone apparatus, a cellular phone apparatus, and a PHS.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A telephone apparatus comprising:
   a transmitter to which a voice spoken by a caller is input;
   a receiver to be placed close to an ear of the caller;
   a speaker that is provided in the telephone apparatus, a front face of the speaker being opposed to said receiver, and a sound being output from the front face of the speaker;
   a first tone hole that is provided in said receiver, and allows the sound output from the front face of the speaker to be emitted to the outside of the telephone apparatus;
   a first path that guides the sound output from the front face of the speaker to the first tone hole;
   a second tone hole that is provided at a position separated from the first tone hole;
   and
   a second path that guides the sound output from the front face of the speaker to the second tone hole extending along the first path;
   wherein the first path and the second path have a common region, and
   wherein the second tone hole is separated from the position of the speaker in the direction of the transmitter.

2. The telephone apparatus according to claim 1, wherein the second tone hole communicates with the speaker through a path that guides the sound output from the speaker to the second tone hole.

3. The telephone apparatus according to claim 1,
   wherein the first path is a chamber that is provided in front of the speaker, and the second path is a propagative chamber that communicates with the second hole through the chamber.

4. The telephone apparatus according to claim 1,
   wherein a gap is provided between a receiver having the first tone hole and an adjacent region, and the second tone hole is formed in the gap in a slit shape.

5. The telephone apparatus according to claim 4,
   wherein the adjacent region is a display unit that displays information including a telephone number.

6. The telephone apparatus according to claim 1,
   wherein a cover hollow is provided between a receiver having the first tone hole and an adjacent region, and the second tone hole is provided in the cover hollow.

7. The telephone apparatus according to claim 6,
wherein the adjacent region is a display unit that displays information of a caller, and the cover hollow is provided along the edge of a display unit cover that protects a display surface of the display unit.

8. A telephone apparatus comprising:
a case which is a housing of the telephone apparatus,
wherein the case includes:
a transmitter to which a voice spoken by a caller is input;
a receiver to be placed close to an ear of the caller;
a speaker that is provided on the rear side of the receiver such that a front face of the speaker is opposed to a rear side of the receiver through a first predetermined chamber interposed therebetween;
a main tone hole that passes through the case from the first chamber to the receiver;
a sub-tone hole that is formed in the case at a position separated from the main tone hole; and
a propagative second chamber formed inside the case, that communicates with the sub-tone hole extending from the first chamber, and
wherein a sound output from the front face of the speaker is emitted to the outside of the telephone apparatus through the main tone hole and the sub-tone hole, and
wherein a path from the speaker to the main tone hole and a path from the speaker to the sub-tone hole have a portion of the first chamber as a common region, and
wherein the sub-tone hole is separated from the position of the speaker in the direction of the transmitter.

9. The telephone apparatus according to claim 8,
wherein a display unit displays information of a caller, a slit is provided between an inner circumferential wall of the case and an adjacent edge of a display unit cover that protects a display surface of the display unit, and the sub-tone hole is provided in the slit.

10. The telephone apparatus according to claim 8, further comprising:
a panel that is mounted on the surface of the case,
wherein a cover hollow is provided between the panel and the case, and
the sub-tone hole communicates with the cover hollow.

11. The telephone apparatus according to claim 10,
wherein the panel is a display unit that displays information of a caller, and the cover hollow is provided along the edge of a display unit cover that protects a display surface of the display unit.

12. The telephone apparatus according to claim 11,
wherein the cover hollow is provided along at least one of four edges of the display unit cover.

13. The telephone apparatus according to claim 7,
wherein the display unit cover is vibrated by the sound output from the second tone hole only.

* * * * *